Nov. 22, 1938.  R. R. CHAPPELL ET AL  2,137,443
SHAFT SPEED INDICATOR
Filed May 16, 1936
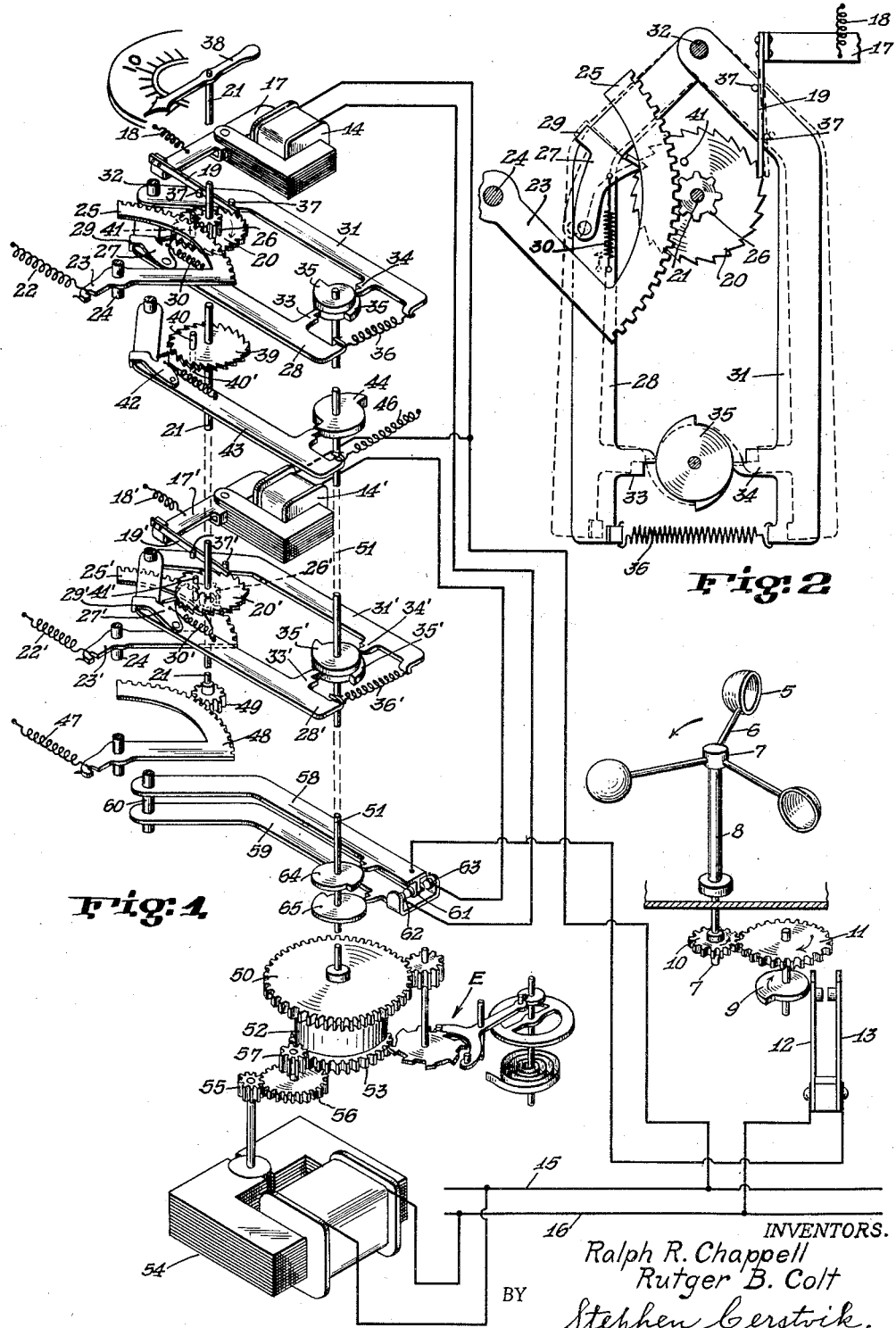
INVENTORS.
Ralph R. Chappell
Rutger B. Colt
BY Stephen Gerstvik.
ATTORNEY.

Patented Nov. 22, 1938

2,137,443

UNITED STATES PATENT OFFICE

2,137,443

SHAFT SPEED INDICATOR

Ralph R. Chappell, Richmond, Va., and Rutger B. Colt, Baltimore, Md., assignors to Bendix Aviation Corporation, South Bend, Ind., a corporation of Delaware Application May 16, 1936, Serial No. 80,208

9 Claims. (Cl. 235—104)

This invention relates to precision instruments and more particularly to means for measuring, transmitting and indicating the angular velocity of a rotating part.

One of the objects of the present invention is to provide novel means for determining the speed of rotation of a member, such as the shaft of a motor, propeller shaft, or the like.

Another object is to provide novel apparatus whereby an indication of the average rotational speed of a member during a predetermined interval of time may be periodically obtained.

Still another object is to provide a novel electric chronometric tachometer wherein electric means are provided for shifting from one of a plurality of totalizing means to another while the indicating means operated thereby indicates the last highest total registered by said totalizing means during each cycle of operation.

A further object is to provide novel means for measuring and indicating the velocity of the wind impinging upon the cups of a rotating anemometer.

Still another object is to provide shaft speed measuring and indicating means wherein the rotating shaft and indicating means may be situated remotely from each other.

Another object is to provide a novel method for measuring and transmitting an indication of the speed of a rotating part or the force causing said rotation when the relationship of said force and the number of revolutions of said part per unit of time is known, said method, in a broad sense, comprising the electric transmission of the revolutions of said part and totalizing the same during a measured time interval.

The above and further objects and novel features of the invention will more fully appear from the following detail description when read in connection with the accompanying drawing. It is to be expressly understood, however, that the drawing is for the purpose of illustration only and is not designed as a definition of the limits of the invention, reference for this latter purpose being had primarily to the appended claims.

In the drawing, wherein like reference characters refer to like parts throughout the several views, Fig. 1 is a diagrammatic view of one form of the measuring, transmitting and indicating apparatus comprehended by the present invention; and, Fig. 2 is an enlarged detail view of part of the totalizing apparatus of Fig. 1.

The present invention comprehends novel means for measuring the angular speed of a rotatable member and for transmitting an indication thereof to a remote station, one embodiment of the same being illustrated in the drawing, by way of example, in a form which is adapted to be combined with a rotating anemometer for the purpose of determining and transmitting indications of wind velocities. The anemometer shown is of the familiar three-cup rotating type, the cups 5 thereof being mounted on arms 6 which are in turn secured to and extend radially from a rotatable spindle or shaft 7 journaled in a vertical support or shaft housing 8. Cups 5 are so designed and the lengths of arms 6 are so proportioned that shaft 7 will be rotated at a speed bearing a known relation to the velocity of the wind impinging on said cups. It will accordingly be seen that by measuring the speed of shaft 7 the wind velocity may be readily determined either mathematically or by proper calibration of an instrument for indicating said measurements.

Novel means are accordingly provided for determining the speed of shaft 7 which means comprises apparatus for transmitting and counting or totalizing the number of revolutions of said shaft during time intervals of a predetermined duration. The sending unit of said totalizing means, in the form shown, includes a cam 9 adapted to be rotatably driven by shaft 7 through reduction gears 10 and 11. Cam 9 engages one of a pair of resilient contact arms 12 and 13 and is adapted to move the contacts thereof into engagement with each other at least once during each revolution of the cam or after each predetermined number of revolutions of shaft 7, said number depending on the relative sizes of gears 10 and 11. It will be apparent that contacts 12 and 13 may be closed more than once during each revolution of cam 9 by providing said cam with additional lobes.

The receiving unit in the illustrated embodiment comprises a pair of solenoids 14 and 14' constituting electro-magnetic means and adapted to be alternately connected in circuit with a source of electric energy 15, 16 and with contacts 12, 13, the opening and closing of the latter being effective to intermittently energize the solenoid so connected in circuit. When solenoid 14, for example, is energized, the same causes an arm 17, which is pivotally mounted intermediate its ends, to move about its pivot in a counterclockwise direction against the efforts of suitable resilient means, such as a coil spring 18. A pawl constituted by a resilient finger 19 is secured to the outer end of arm 17, the free end of said finger being adapted to engage a ratchet wheel 20 which, in the form shown, is loosely mounted on a rotatable shaft 21. The reciprocation of pawl 19 by solenoid 14 and spring 18 as the former is intermittently energized is effective to move ratchet 20 in the usual step-by-step fashion in a clockwise direction, as viewed in the drawing. Since the operative solenoid is energized each time switch 12, 13 is closed, i. e. after each predetermined number of revolutions of spindle 7, it will be apparent that each movement or step of ratchet 20 is indicative of said predetermined number of revolutions.

Movement of ratchet 20 by pawl 19 may be yieldingly resisted by any suitable means such as a tension spring 22 acting at one end of a lever 23 that is pivotally mounted at 24 and has an arcuate rack 25 on the other end thereof. Said rack meshes with a pinion 26 which is integral with or rigidly secured to ratchet 20 and, like said ratchet, is loosely journaled on shaft 21. The return or counterclockwise movement of ratchet 20 by rack 25 is normally prevented by a detent or pawl 27 that is pivotally mounted on an arm or support 28, the clockwise movement of said pawl being limited by a hooked portion 29 thereof which engages the edge of arm 28. Counterclockwise movement of pawl 27 about its pivot to permit actuation of ratchet 20 by pawl 19 is yieldingly resisted by a coil spring 30.

In order to release ratchet 20 for movement by rack 25, novel means are provided for moving and holding pawls 19 and 27 out of the path of the teeth on said ratchet, said means, in the illustrated embodiment, being constituted by arm 28 and a similar arm 31 which are mounted on a common pivot 32 and extend on opposed sides of ratchet 20. Said arms have inwardly projecting portions 33 and 34, respectively, adjacent the free ends thereof, which portions are normally held in engagement with a pair of rotatable, single-lobed cams 35, 35 by means of a tension spring 36 interposed between arms 28 and 31. As shown, cams 35 are secured to shaft 51 with the lobes thereof spaced 180° apart, one of the cams being adapted to be engaged by follower 33 and the other by follower 34 so that arms 28 and 31 will be simultaneously pivoted thereby once during each revolution of shaft 51. Thus when cams 35 are rotated in a counterclockwise direction, follower arms 28 and 31 are periodically pivoted away from one another, and pawl 27, by reason of the hook portion 29, and pawl 19, which is flanked by pins 37, 37 that project upwardly from arm 31, are withdrawn from ratchet 20 as shown in dotted lines in Fig. 2, whereupon said ratchet is free to rotate in response to the efforts of spring 22. A suitable stop (not shown) adapted to cooperate with the upwardly projecting portion of a pin 41 may be provided for limiting the movement of ratchet 20 by said spring and hence stopping ratchet 20 in a predetermined reference or zero position.

The clockwise movement of ratchet 20 by pawl 19, which movement, as pointed out about, is indicative of the number of revolutions made by shaft 7, may be transmitted to any suitable indicating means, such as pointer 38. Said pointer, in the form shown, is mounted on shaft 21 on which there is also mounted a ratchet disc 39, the latter being secured to said shaft adjacent ratchet 20 and having a pin or lug 40 thereon adapted to be engaged by a similar pin 41 extending downwardly from ratchet 20 whereby the clockwise movement of said latter ratchet is transmitted to pointer 38. Indicator ratchet 39 is normally held against reverse or counterclockwise movement by a detent or pawl 42 and is adapted to be released for movement in that direction by pivotal movement of an arm 43, said pawl and arm being substantially identical with pawl 27 and arm 28 above described. A rotatable cam 44 is provided for pivoting arm 43 to release ratchet 39, said arm being held in engagement with said cam by a spring 46. When released, ratchet 39 is adapted to be rotated in a counterclockwise direction by a spring 47 cooperating with a rack 48 which meshes with a pinion 49 secured to the lower end of shaft 21.

In order that more frequent and more inclusive indications of wind velocity or shaft speed may be obtained by the method of the present invention, a second counting or totalizing unit comprising a pawl and ratchet together with release and return mechanisms therefor similar to the above described apparatus adapted to be actuated by solenoid 14 is operably associated with solenoid 14', the only difference in the two units being that the upwardly projecting portion of a pin 41' on ratchet 20' engages a pin 40' which projects downwardly from ratchet 39 to impart clockwise movement to pointer 38, and the downwardly projecting portion of pin 41' is adapted to engage a stop (not shown) for limiting the counterclockwise movement of ratchet 20'. Because of the similarity of the two totalizing units both in construction and operation, the description thereof is not repeated, but parts of the lower or second unit are designated by primed numerals corresponding to the numerals applied to like parts of the first or upper unit, as viewed in the drawing.

In order to determine the speed of shaft 7 and hence the velocity of the wind acting on cups 5, novel means are provided whereby the counters or totalizing means above described are caused to actuate pointer 38 so that the position of the same will be indicative of totals registered by said totalizing means during either successive or intermittent time intervals of predetermined duration. The dial over which pointer 38 operates may accordingly be calibrated in terms of shaft revolutions per unit of time or, in the present instance, in miles of wind per unit of time, such as knots. The timing means may be constituted by any suitable constant speed driving means and in the illustrated embodiment is shown as being constituted by a clock mechanism which comprises a rotatable gear 50 that is secured to a shaft 51 on which cams 35, 44 and 35' are mounted. Gear 50 is adapted to be rotatably driven by a main spring 52 interposed in the usual manner between said gear and a gear 53 which is in turn operably connected with the armature of a shaded-pole induction motor 54 through a reduction gear train 55, 56, 57. Said motor is effective to keep main spring 52 under a substantially constant tension, the same remaining stalled whenever the spring is fully wound. The rotation of gear 50 and hence of shaft 51 is controlled by an escapement mechanism of any usual or well known construction, the whole of which is designated in the drawing by the letter E. Motor 54 is connected to leads 15, 16 and is continuously energized thereby during the operation of the device.

Means are provided for alternately connecting solenoids 14 and 14' in circuit with switch 12, 13 during successive counting intervals in order that the time required for the return movement of ratchets 20 and 20' may be ignored and said counting intervals made as short as may prove desirable. Such means are preferably constituted by a single-pole, double-throw switch including a pair of contact carrying arms 58 and 59 mounted on a common pivot 60, the former arm having a contact 61 thereon which is adapted to engage either of a pair of contacts 62 and 63 on the latter arm. Arms 58 and 59 are adapted to be actuated by a pair of cams 64 and 65, respectively, which are mounted on shaft 51 so that contact 61 is caused to alternately engage contacts 62 and 63, each during a predetermined interval of time as measured by the clock mechanism which drives shaft 51 and hence cams 64 and 65.

In operation, wind impinging upon cups 5 causes shaft 7 to rotate at a speed proportional to the velocity of said wind, the revolutions which said shaft will make per unit of time for any given wind velocity depending upon the size of said cups and the radius of arms 6. After each predetermined number of revolutions of shaft 7, said number being dependent upon the relative sizes of gears 10 and 11, cam 9 is effective to move contact 12 into engagement with contact 13 to close a circuit through and accordingly energize one of the solenoids 14 or 14' depending upon whether contact 61 is at that time in engagement with contact 62 or 63, respectively.

Assume, by way of example, that anemometer 5, 6 is designed to be rotated at a speed of 920 R. P. M. by wind having a velocity of 80 knots, or an equivalent of about 11½ R. P. M. per knot. Also assume that the ratio of gears 10 and 11 is such that a speed of 320 R. P. M. is imparted to cam 9 through said gears by a wind traveling at 80 knots. For each knot of wind, therefore, cam 9 will revolve four times per minute or once every fifteen seconds. If the latter interval, then, is taken as the counting or totalizing interval, it will be apparent that the number of revolutions of cam 9 and hence the number of times solenoid 14 is energized during such interval will equal the average velocity of the wind in knots during that interval. Since pointer 38 is moved a predetermined distance by means of pawl 19, ratchet 20, pins 41, 40, ratchet 39 and shaft 21 each time solenoid 14 is energized, it will also be apparent that the distance said pointer is moved from its reference position during each of said fifteen second intervals will be indicative of the number of revolutions made by shaft 7 during that time and hence of the velocity of the wind acting on cups 5.

During the fifteen second interval when solenoid 14 is in circuit with contacts 12, 13 and hence adapted to be intermittently energized, pointer 38 is moved intermittently in the above described manner and, on the basis of the above assumptions, each movement or step thereof represents a wind velocity of one knot, and the total of the movements or steps of said pointer during the counting interval represents the actual wind velocity in knots. At the end of said fifteen second interval cams 64 and 65 are effective to disengage contacts 61, 62 and subsequently engage contacts 61, 63, thereby connecting solenoid 14' instead of solenoid 14 in circuit with contacts 12, 13 for intermittent energization to impart similar step-by-step movement to ratchet 20' and pin 41'. If the movement of ratchet 20' during the chosen interval is greater than the movement of ratchet 20 during the previous interval, pin 41' will engage pin 40' and move pointer 38 beyond the position to which the same was previously moved and held by ratchet 20. Shortly after the termination of the interval during which solenoid 14' is operative, pairs of cams 35 and 35', which are rotated at a constant speed by clock gear 50, are effective to spread pairs of arms 28, 31 and 28', 31' respectively and thereby release ratchets 20 and 20' for counterclockwise movement by racks 25 and 25' until pins 41 and 41' come up against stops (not shown) in a reference or starting position. At this time pointer 38 is being held by pawl 42 in the last highest position to which it was moved by the totalizer ratchets 20 and 20'.

If, during the next counting interval when solenoid 14 is again energized, pin 41 is not moved sufficiently far to contact pin 40, then at the end of said interval when cam 44, which is likewise rotated at constant speed by clock gear 50, pivots arm 43 thereby releasing ratchet 39, the latter will fall off, i. e. be moved in a counterclockwise direction by spring 47 and rack 48, until pin 40 comes up against pin 41 and pointer 38 is in position to indicate the last totalization representing wind velocity. Cam 44 is preferably provided with two lobes spaced 180° apart so that pointer 38 will be released at the end of each counting interval and on each even numbered interval it is moved to the last position of either pin 41 or pin 41', whichever is the highest. On the odd numbered intervals, pointer 38 indicates the speed of the interval just preceding, be it higher or lower. Thus if the wind velocity is decreasing and a lower count is had during successive cycles of operation, pointer 38 will fall off when released at the end of the counting intervals to the then highest position of either pin 41 or pin 41', if it be an even numbered interval but if a higher count is had during either an even or an odd numbered interval representing an increase in wind velocity, the pointer will be moved up, i. e. clockwise, during the counting interval and retained there until the next interval is terminated.

The alternate energization of solenoids 14 and 14', i. e. the shift from one totalizing unit to the other, is thus brought about electrically while pointer 38 is maintained at the end of the even numbered intervals in a position representing the last highest total registered by either of said units. Said alternate energization is effected by the engagement of electric contacts 61, 62 and 61, 63 which are actuated and caused to be alternately and periodically moved into engagement by cams 64 and 65 which are secured to shaft 51 and accordingly rotated in synchronism with the other cams on said shaft.

If desired, either cams 35, 35 or cams 35', 35' may be shifted 180° on shaft 51 so that ratchets 20 and 20' will be alternately released rather than simultaneously, as in the embodiments shown. When so operated the intervals can be made very short and continuously successive without any non-counting intervals between, as the ratchet 20 will be moving back to zero while 20' is being driven. When so operated the pointer 38 always indicates the speed of the last interval, be it higher or lower than the speed during the preceding intervals. It will also be noted that the various cams may be designed and so arranged that the successive counting intervals may be either continuous or separated by non-counting intervals during the latter of which contact 61 will assume a middle position between contacts 62 and 63 and neither of the solenoids 14 or 14' will be connected in circuit for energization. It will also be apparent that the cams may be so positioned relative to one another that ratchet 39 will be released for return movement to a zero position after each counting interval, i. e. such as simultaneously with the release of each of the ratchets 20 and 20'.

There is thus provided novel means and method for measuring, transmitting and indicating the speed of a rotating member or the value of the forces tending to rotate the same. The indication obtained will be exact for a constant speed member and represent the average speed for a predetermined time interval of a member which is not operating at a constant or uniform speed.

Although only one embodiment of the invention has been illustrated and described, it is to be expressly understood that the same is not limited thereto. The shapes and relative positions of the several cams shown, for example, are merely exemplary, as is the type of constant speed motor employed. If desired, pointer 38 may be connected directly to ratchet 20 or 20' for movement therewith, and gears 50 and 53 of the clock means may be rigidly connected without the interposition of spring 52. It will be understood also that the phrase "predetermined number of revolutions" as used in the foregoing description and in the claims is intended to include one or less than one revolution. Various other changes may also be made in the design and arrangement of parts illustrated without departing from the spirit and scope of the invention, as will now be apparent to those skilled in the art. For a definition of the limits of the invention, reference will be had primarily to the appended claims.

What is claimed is:

1. In apparatus of the class described, totalizing mechanism including an indicating element, a pair of electromagnets for actuating said element in one direction and means normally holding said element against movement in the other direction, a source of electric energy, means for alternately and periodically connecting said electromagnets in circuit with said source for time intervals of predetermined duration, means for opening and closing said circuit to intermittently energize said electro-magnets, a rotatable member for controlling said last named means in accordance with the number of revolutions made by said member, means for periodically releasing said holding means, and means for holding said indicating element at the position to which it has been actuated by one of said electro-magnets while the other of said electro-magnets is actuated.

2. In an apparatus of the class described, a rotatable member, a source of electric energy, a pair of totalizing units each comprising electromagnetic means and an element operable in one direction by each of said electro-magnetic means, an indicating pointer operable in one direction by said elements, means urging said elements and pointer in the other direction, means for holding each of said elements and pointer against said movement, means for alternately connecting said electro-magnetic means in circuit with said source, means maintaining said pointer in the position corresponding to the position of the one of said elements which had the greatest movement from zero position during the two previous totalizing intervals, switch means in said circuit controlled by said rotatable member for intermittently energizing said electro-magnetic means to move said elements, means for periodically releasing each of said holding means, and means for moving each of said elements and pointer in said other direction when the respective holding means therefor are released.

3. In apparatus of the class described, a pair of totalizing units each comprising electro-magnetic means, an indicating member, means connecting said magnetic means and member whereby said member is advanced by each of said electro-magnetic means, means for retracting said member, means for alternately and periodically energizing said electro-magnetic means during predetermined intervals, and means for holding said indicating member during one counting interval from moving to a lower indicating position than that representing the total registered by one of said units during a previous counting interval.

4. In an apparatus of the class described, a rotatable member, a rotatable element, an indicating pointer, means for moving said element a predetermined distance for each predetermined number of revolutions of said member, disengageable means connecting said element and pointer whereby the latter may be moved in one direction by the former, means urging said element and pointer in the other direction, means normally holding said element and pointer against the last said movement, means operative periodically for successively releasing said pointer and element for independent movement in said other direction, and means for moving said pointer and element in said other direction.

5. In apparatus of the class described, a rotatable member, electro-magnetic means, means for intermittently energizing said electro-magnetic means in accordance with the number of revolutions of said rotatable member, a movable element intermittently operable in one direction by said electro-magnetic means, means urging said element in the opposite direction, means normally holding said element against the last said movement, cam means for releasing said element for movement in said other direction, and power means for driving said cam means at a constant speed.

6. In apparatus of the class described, electro-magnetic means, means for intermittently energizing the same, a ratchet, a pawl cooperating with said ratchet and adapted to be actuated by said electro-magnetic means to move said ratchet intermittently in one direction, means urging said ratchet for return movement, means for holding said ratchet against the last said movement, means including a rotatable cam for releasing said holding means, means for rotating said cam at uniform speed whereby said releasing takes place at regular intervals, means actuated by said ratchet for movement in one direction upon the intermittent movement of said ratchet, means urging said actuated means in the opposite direction, means for holding said actuated means against movement in said opposite direction whereby summation of said intermittent movement is achieved, and means including a rotatable cam operated by said uniform speed means for releasing said last holding means.

7. In apparatus of the class described, two sets of electro-magnetic means, means for intermittently energizing the same, a ratchet for each of said electro-magnetic means, a pawl for each ratchet cooperating therewith and adapted to be actuated by the respective electro-magnetic means to move said ratchet intermittently, means urging said ratchet for return movement, means for holding each of said ratchets against the last said movement, means including a rotatable cam for releasing each of said holding means, means for rotating said cams at uniform speed whereby said releasing takes place at regular intervals, means operated by said uniform speed means to determine which of said electro-magnets is in circuit with the intermittent energizing means, means disposed in the path of rotation of said ratchets for movement in one direction upon the intermittent movement thereof, means urging said last named means for return movement, means for holding said means against said engagement whereby summation of said intermittent movement is achieved and cam means operated by said uniform speed means whereby said last holding means are released, said releasing cams being so disposed relatively that said second actuated means assumes the higher of the two summative positions of said ratchets.

8. In a device of the class described, a rotatable member, electric circuit means operated periodically by said rotatable member, electromagnetic means connected to said circuit means whereby said means are periodically energized, a rotatable element, means whereby said element is rotated a predetermined distance for each energization of said electro-magnetic means, a pointer, disengageable means connecting said element and pointer whereby said pointer is moved in one direction by said element, means urging said element and pointer to move in the other direction, means normally holding said element and pointer against the last said movement, means operative periodically for successively releasing said pointer and element for independent movement in said other direction and means for moving said pointer and element in said other direction.

9. In a device of the character described, a rotatable member, a source of electric energy, a pair of totalizing units each comprising electro-magnetic means, and a pawl and a ratchet element operable in one direction by each of said electro-magnetic means, means detachably connected to said ratchet, a pointer operable in one direction by said detachable means, means urging said elements and detachable means in the other direction, means for holding each of said elements and said detachable means against the last said movement, can means mounted on a shaft for periodically releasing each of said holding means, means for rotating said shaft at uniform speed, said cam means being adjustable whereby the releasing sequence of said holding means may be adjusted, means operated by said shaft alternately connecting said electro-magnetic means in circuit with said source and switch means in said circuit controlled by said rotatable member for intermittently energizing said electro-magnetic means whereby the rotative speed of said member may be indicated by said pointer.

RALPH R. CHAPPELL.
RUTGER B. COLT.